United States Patent
Dorie et al.

(10) Patent No.: US 10,629,388 B2
(45) Date of Patent: Apr. 21, 2020

(54) GELLED AQUEOUS POLYMER COMPOSITION, PYROLYSED CARBONATED COMPOSITION PRODUCED THEREFROM FOR A SUPERCAPACITOR ELECTRODE, AND METHODS FOR THE PRODUCTION THEREOF

(71) Applicant: HUTCHINSON, Paris (FR)

(72) Inventors: Hugo Dorie, Montargis (FR); David Ayme-Perrot, Huningue (FR); Philippe Sonntag, Avon (FR); Bruno Dufour, Champagne sur Seine (FR)

(73) Assignee: HUTCHINSON, Paris (FR)

( * ) Notice: Subject to any disclaimer, the term of this patent is extended or adjusted under 35 U.S.C. 154(b) by 99 days.

(21) Appl. No.: 15/316,775

(22) PCT Filed: Jun. 10, 2015

(86) PCT No.: PCT/IB2015/054372
§ 371 (c)(1),
(2) Date: Dec. 6, 2016

(87) PCT Pub. No.: WO2015/189776
PCT Pub. Date: Dec. 17, 2015

(65) Prior Publication Data
US 2017/0197839 A1 Jul. 13, 2017

(30) Foreign Application Priority Data
Jun. 11, 2014 (FR) .................................... 14 55293

(51) Int. Cl.
| | |
|---|---|
| *H01G 11/34* | (2013.01) |
| *C08G 8/22* | (2006.01) |
| *H01G 11/44* | (2013.01) |
| *H01G 11/32* | (2013.01) |
| *H01G 11/24* | (2013.01) |
| *C01B 32/05* | (2017.01) |
| *C01B 32/354* | (2017.01) |
| *C01B 32/342* | (2017.01) |
| *C08G 73/06* | (2006.01) |

(52) U.S. Cl.
CPC ............ *H01G 11/34* (2013.01); *C01B 32/05* (2017.08); *C01B 32/342* (2017.08); *C01B 32/382* (2017.08); *C08G 8/22* (2013.01); *C08G 73/0683* (2013.01); *H01G 11/24* (2013.01); *H01G 11/32* (2013.01); *H01G 11/44* (2013.01); *C01P 2006/12* (2013.01); *C01P 2006/14* (2013.01); *C01P 2006/16* (2013.01); *C01P 2006/40* (2013.01); *C08G 2210/00* (2013.01); *Y02E 60/13* (2013.01); *Y02T 10/7022* (2013.01)

(58) Field of Classification Search
None
See application file for complete search history.

(56) References Cited

U.S. PATENT DOCUMENTS 9,133,295 B2 *  9/2015 Qureshi ................... C08G 8/22
2011/0303880 A1 * 12/2011 Mulik ................ B01J 13/0091
                                                              252/502

FOREIGN PATENT DOCUMENTS

| WO | 2014/033124 A1 | 3/2014 |
|---|---|---|
| WO | 2014/060904 A1 | 4/2014 |

OTHER PUBLICATIONS

International Search Report dated Aug. 24, 2015, in PCT/IB2015/054372, filed Jun. 10, 2015.
Dan Liu et al., "One-pot aqueous route to synthesize highly ordered cubic and hexagonal mesoporous carbons from resorcinol and hexamine.", Carbon, vol. 50, 2012, pp. 476-487.
Dan Liu et al., "Simple hydrothermal synthesis of ordered mesoporous carbons from resorcinol and hexamine", Carbon, vol. 49, 2011, pp. 2113-2119.
Keith Lenghaus et al., "Controlling carbon microporosity: the structure of carbons obtained from different phenolic resin precursors", Carbon, vol. 40, 2002, pp. 743-749.

* cited by examiner

*Primary Examiner* — William D Young
(74) *Attorney, Agent, or Firm* — Oblon, McClelland, Maier & Neustadt, L.L.P.

(57) ABSTRACT

The invention relates to a gelled aqueous polymer composition for forming, by means of drying then pyrolysis, a monolithic porous carbon, to a pyrolysed carbonated composition produced by the drying, followed by the pyrolysis, of said gelled composition, to a porous carbon electrode for a supercapacitor comprising said pyrolysed composition, and to methods for producing said respectively gelled and pyrolysed compositions. A gelled composition according to the invention, produced from the polycondensation of polyhydroxybenzene(s) and hexymethylenetetramine, is such that the hexymethylenetetramine comprised therein represents a mass fraction of between 7% and 15% inclusive. Said gelled composition is produced by a) polycondensation in an aqueous solvent of the polyhydroxybenzene(s) and hexymethylenetetramine, followed by b) gelling by heating of said polycondensate.

9 Claims, No Drawings

GELLED AQUEOUS POLYMER COMPOSITION, PYROLYSED CARBONATED COMPOSITION PRODUCED THEREFROM FOR A SUPERCAPACITOR ELECTRODE, AND METHODS FOR THE PRODUCTION THEREOF

The present invention relates to a gelled aqueous polymer composition capable of forming, by drying and then pyrolysis, a monolithic porous carbon, to a pyrolyzed carbon-based composition obtained by drying and then pyrolysis of this gelled composition, to a porous carbon electrode comprising this pyrolyzed composition and to processes for the preparation of these respectively gelled and pyrolyzed compositions. The invention applies in particular to supercapacitor electrodes, for example suitable for equipping electric vehicles.

Supercapacitors are electrical energy storage systems which are particularly advantageous for applications requiring the conveying of high power electrical energy. Their aptitude for rapid charges and discharges and their increased lifetime with respect to a high-power battery makes them promising candidates for many applications. Supercapacitors generally consist of the combination of two porous conductive electrodes having a high specific surface, immersed in an ionic electrolyte and separated by an insulating membrane, referred to as "separator", which makes possible ionic conductivity and prevents electrical contact between the electrodes. Each electrode is in contact with a metal collector which makes possible exchange of the electric current with an external system. Under the influence of a difference in potential applied between the two electrodes, the ions present within the electrolyte are attracted by the electrode surface exhibiting an opposite charge, thus forming an electrochemical double layer at the interface of each electrode. The electrical energy is thus stored electrostatically by separation of the charges. The expression of the capacitance C of a supercapacitor is identical to that of a conventional capacitor, i.e.: $C=\varepsilon \cdot S/t$, where $\varepsilon$ denotes the permittivity of the medium, S the surface area occupied by the double layer, and t the thickness of the double layer.

The capacitances achievable within supercapacitors are much greater than those achieved by conventional capacitors, as a result of the use of carbon-based electrodes having a very high specific surface and of the extreme fineness of the electrochemical double layer (typically with a thickness of a few nm). These carbon-based electrodes have to be conductive in order to ensure the transportation of the electric charges, porous in order to ensure the transportation of the ionic charges and the formation of the electrochemical double layer over a large surface area, and chemically inert in order to prevent any energy-consuming side reaction.

The energy E stored within a supercapacitor is defined according to the conventional expression for capacitors, i.e.:

$E=\frac{1}{2} \cdot C \cdot V^2$, where $V$ is the potential of the supercapacitor.

The capacitance and the potential are thus two essential parameters which are necessary to be optimized in order to promote the energy performances. The capacitance depends on the porous texture actually accessible by the electrolyte. And, for applications in transportation and in particular for an electric vehicle, it is necessary to have a high energy density available in order to limit the on-board weight of the supercapacitor, which requires having a high mass capacitance. The potential of a supercapacitor depends mainly on the nature of the electrolyte used and in particular on its electrochemical stability, it being specified that there exist two main families of electrolytes, which are organic electrolytes and aqueous electrolytes.

In a known way, carbon-based materials, in the powder or monolith form, prove to be the best suited to such applications. This is because they exhibit a high specific surface area (which can conventionally be from 500 to 2000 $m^2/g$) and a porosity capable of forming the electrochemical double layers necessary for the energy storage.

The document of the applicant WO-A1-2014/060904 discloses a monolithic porous carbon, which is predominantly microporous, for a supercapacitor electrode resulting from the pyrolysis of a gel obtained by polycondensation of a polyhydroxybenzene, such as resorcinol, formaldehyde and a water-soluble cationic polyelectrolyte.

Although the porous carbons obtained in this document are entirely satisfactory, they exhibit the disadvantage of being obtained from a formaldehyde precursor which can present problems of toxicity owing to the fact that it is classified as carcinogenic to man.

The paper "Simple hydrothermal synthesis of ordered mesoporous carbons from resorcinol and hexamine" by Dan Liu et al., Carbon, 49 (2011), 2113-2119, teaches, for energy storage, the preparation in an aqueous medium of carbon-based gels and their pyrolyzates RF-350 and RF-900 in the form of a powder of an essentially mesoporous and ordered carbon (these pyrolyzates are in fact to a minor extent microporous in volume, see table showing a maximum content of microporous volume of 32% only for the RF-900 carbon, with a high porous volume which is greater than 0.50 $cm^3/g$ and even close to 1 $cm^3/g$ for RF-900). These gels are prepared from resorcinol (R) and hexamethylenetetramine (HMT) precursors with a fraction by weight of HMT in the gel of 1.74% and in the presence of an amphiphilic copolymer "Pluronic F127" (ethylene oxide/propylene oxide/ethylene oxide) which reacts with a hydrophobic agent, trimethylbenzene (TMB). One thus obtains, around the hydrophobic agent, micelles formed of the amphiphilic copolymer and resulting in the desired mesoporous structure, the size of the pores of which is defined by the micelles.

The paper "One-pot aqueous route to synthesize highly ordered cubic and hexagonal mesoporous carbons from resorcinol and hexamine" by Dan Liu et al., Carbon 50 (2012), 476-487, discloses a similar process in an aqueous medium for obtaining gels and their pyrolyzates RF-1 and RF-2 in the form of a powder of a carbon which is predominantly mesoporous in volume by means of the same precursors R and HMT (with a fraction by weight of HMT in the gel of the order of 1.20%) and of the same additives "Pluronic F127" and TMB, at a combining temperature of 80° C.

The processes disclosed in these papers exhibit in particular as major disadvantages that of requiring a large amount of amphiphilic copolymer, which is expensive, and that of resulting in carbons which are predominantly mesoporous in volume, which damages the capacitance of the electrodes of supercapacitors based on these porous carbons.

One aim of the present invention is to provide a gelled aqueous polymer composition capable of forming, by drying and then pyrolysis, a monolithic porous carbon, the composition comprising the product of a polycondensation reaction in an aqueous solvent W of poly-hydroxybenzene(s) R and hexamethylenetetramine H according to an H/(R+H+W) fraction by weight used for said reaction, which overcomes these disadvantages while additionally exhibiting a very high microporous specific surface combined with a low pore volume.

This aim is achieved in that the applicant company has just discovered, surprisingly, that a polycondensation in an aqueous solvent W of these precursors R and H with a fraction by weight of H ranging from 7% to 15% approximately makes it possible to obtain a polycondensate which, after gelling, drying and then pyrolysis, forms a porous carbon which is advantageously monolithic and very predominantly microporous, i.e. with a specific surface microporous to at least 80%, and a pore volume which is less than 0.50 cm$^3$/g and which is microporous to more than 50%.

A gelled aqueous polymer composition according to the invention is thus such that said H/(R+H+W) fraction by weight is between 7% and 15% inclusive.

The terms "Gelled composition" or "gel" means, in a known way, a mixture of a colloidal material and of a liquid which is formed spontaneously or under the action of a catalyst by a flocculation and a coagulation of a colloidal solution. It should be remembered that a distinction is made between chemical gels and physical gels, the chemical gels owing their structure to a chemical reaction and being by definition irreversible, as is the case in the present invention, whereas, for physical gels, the aggregation between the macromolecular chains is reversible.

It should be noted that this use of hexamethylenetetramine (methylene donor of polyalkenepolyamine type, also known as hexamine, methenamine or HMT in the literature) exhibits the advantage of a synthesis of the irreversible gels according to the invention carried out without a toxic product, such as formaldehyde, which is carcinogenic to man.

Preferably, said H/(R+H+W) fraction by weight is between 10% and 14% inclusive for said reaction.

According to another feature of the invention, the polyhydroxybenzene(s) R and the hexamethylenetetramine H are used for said reaction according to an R/H molar ratio of between 2 and 4 and preferably between 2.5 and 3.5 inclusive.

According to yet another feature of the invention, the polyhydroxybenzene(s) R and said aqueous solvent W are used for said reaction according to an R/W ratio by weight of between 0.07 and 1 and preferably between 0.4 and 0.7 inclusive.

According to another aspect of the invention, the composition can advantageously be devoid of any amphiphilic polymer, of any polyelectrolyte and/or of any hydrophobic compound. Thus, said gelled composition can in particular be devoid of amphiphilic copolymer comprising ethylene oxide/propylene oxide/ethylene oxide blocks and of hydrophobic compound of trimethylbenzene (TMB) type, the composition being for this reason devoid of micelles.

According to another feature of the invention, said aqueous solvent W can be water and advantageously formaldehyde is not used for said reaction.

Mention may thus be made, among the precursor polymers which can be used in the invention, of those resulting from the polycondensation of at least one monomer of the polyhydroxybenzene type and of hexamethylenetetramine. This polymerization reaction can involve more than two distinct monomers, additional monomers being or not being of the polyhydroxybenzene type. The polyhydroxybenzenes which can be used are preferably di- or trihydroxybenzenes and advantageously resorcinol (1,3-dihydroxybenzene) or the mixture of resorcinol with another compound chosen from catechol, hydroquinone or phloroglucinol.

A pyrolyzed carbon-based composition according to the invention is obtained by drying and then pyrolysis of said gelled composition and forms a monolithic porous carbon with a specific surface of greater than 550 m$^2$/g and with a pore volume of less than 0.50 cm$^3$/g, and this pyrolyzed composition is such that said pore volume is microporous (with by definition diameters of pores of less than 2 nm) according to a fraction by volume of greater than 50% and that said specific surface is microporous (with by definition diameters of pores also of less than 2 nm) according to a fraction by surface equal to or greater than 80% and preferably equal to or greater than 90%, indeed even 95%, said pore volume and said specific surface being measured by nitrogen adsorption manometry at 77 K.

Advantageously, said specific surface can be equal to or greater than 580 m$^2$/g and said pore volume can be less than or equal to 0.40 cm$^3$/g.

Also advantageously, said pore volume can be microporous according to a fraction by volume of greater than 55%, said porous carbon preferably exhibiting a micropore volume of between 0.15 cm$^3$/g and 0.25 cm$^3$/g.

More advantageously still, said pore volume can be microporous according to a fraction by volume equal to or greater than 70%.

It should be noted that this essentially microporous structure of the porous carbons of the invention is by definition characterized by diameters of pores of less than 2 nm, in contrast to the mesoporous structures, which are by definition characterized by diameters of pores of between 2 nm and 50 nm inclusive.

A porous carbon electrode according to the invention can be used to equip a supercapacitor cell and is such that the electrode comprises, as active material, said pyrolyzed composition.

It should be noted that the microporosity plays an important role for the formation of the electrochemical double layer in such a cell and that the porous carbons which are predominantly microporous of the invention advantageously make it possible to have available a high specific energy and a high capacitance for these supercapacitor electrodes.

A process for the preparation according to the invention of said gelled composition comprises:

a) a polycondensation reaction in an aqueous solvent W, such as water, of polyhydroxybenzene(s) R and hexamethylenetetramine H, preferably without using formaldehyde, in order to obtain a polycondensate in an aqueous medium, then b) a gelling by heating said polycondensate, in order to obtain the gelled composition.

It should be noted that this process of the invention advantageously does not use a catalyst for carrying out step a).

According to a specific embodiment of the invention, step a) comprises:

a1) a dissolution of the polyhydroxybenzene(s) R in a first portion of said aqueous solvent W, in order to obtain a first aqueous solution, a2) a dissolution by heating of the hexamethylenetetramine H in a second portion of said aqueous solvent, in order to obtain a second aqueous solution, and a3) bringing the first aqueous solution into contact with the second aqueous solution, until a third homogeneous aqueous solution comprising said polycondensate is obtained.

A process for the preparation according to the invention of said pyrolyzed carbon-based composition comprises:

a) a polycondensation reaction in an aqueous solvent W, such as water, of polyhydroxybenzene(s) R and hexamethylenetetramine H, preferably without using an aldehyde precursor, in order to obtain a polycondensate in an aqueous medium, b) a gelling by heating said polycondensate in order to obtain the gelled composition, c) a drying of said gelled composition, then d) a pyrolysis of the gelled and dried composition obtained in c), typically at more than 600° C., in order to obtain said porous carbon.

Advantageously, this process can additionally comprise, after step d), a step e) of activation of said porous carbon comprising an impregnation of said porous carbon with a sulfur-based strong acid, preferably with an acid which is provided in the form of a solution with a pH of less than 1 and which is chosen from sulfuric acid, oleum, chlorosulfonic acid and fluorosulfonic acid, as described in document EP-B1-2 455 356 of the applicant, with, for example, the use of sulfuric acid (18M $H_2SO_4$) for this process of the invention.

Other characteristics, advantages and details of the present invention will emerge on reading the following description of examples of carrying out the invention, given by way of illustration and not of limitation.

EXAMPLES OF PREPARATION ACCORDING TO THE INVENTION OF GELLED AND PYROLYZED COMPOSITIONS, IN COMPARISON WITH A "CONTROL" EXAMPLE OF SUCH COMPOSITIONS

Two gelled aqueous polymer compositions G1 and G2 according to the invention, corresponding to examples 1 and 2 below, both resulting from the polycondensation of resorcinol R (from Acros Organics, 98% pure) and hexamethylenetetramine H (supplied by Sigma-Aldrich), and a "control" gelled aqueous polymer composition G0, resulting from the polycondensation of the same resorcinol R but with formaldehyde F (from Acros Organics, 37% pure) in place of hexamethylenetetramine, were prepared.

The formulations used for these three compositions G1, G2 and G0 are described in detail in table 1 below, with:

R/H: resorcinol/hexamethylenetetramine molar ratio,
R/W: resorcinol/water ratio by weight, and
% H: fraction by weight of hexamethylenetetramine in each gelled composition G1 and G2.

TABLE 1

|  | G1 | G2 | G0 |
| --- | --- | --- | --- |
| Resorcinol R | 175.21 g | 175.21 g | 175.21 g |
| Hexamethylenetetramine H | 74.36 g | 74.36 g | — |
| Formaldehyde F | — | — | 258.30 g |
| Distilled water | 350.42 g | 292.02 g | 311.20 g |
| R/H | 3 | 3 | — |
| R/W | 0.5 | 0.6 | 0.4 |
| % H | 12.39 | 13.73 | — |

Preparation of Gelled Compositions G1, G2 and G0 and of Pyrolyzed Compositions C1, C2 and C0 Which Result Therefrom:

During a first step, the resorcinol was first dissolved in half of the distilled water with magnetic stirring. At the same time, the hexamethylenetetramine for the compositions G1 and G2 was dissolved in the remaining water half using a reactor immersed in an oil bath between 40° C. and 80° C. After complete dissolution of the hexamethylenetetramine for the purpose of preparing G1 and G2, the water/resorcinol mixture was added until a homogeneous solution was obtained (in order to prepare the composition G0, formaldehyde F was used in place of hexamethylenetetramine H).

During a second step, this polycondensate solution was poured into molds with a thickness of 2 mm made of steel covered with Teflon® and then gelling was carried out at 90° C. for 24 hours. The organic gels thus formed were subsequently dried at 85° C. and 85% humidity for 6 hours. The carbon-based compositions C1, C2 and C0, respectively resulting from G1, G2 and G0, were subsequently obtained by pyrolysis at 800° C. under nitrogen in the form of monolithic porous carbons. The flat monoliths obtained were machined to a set thickness of 0.7 mm and were then characterized.

During a third optional step, the porous carbon C1 thus obtained was activated using a treatment with sulfuric acid (18M $H_2SO_4$), as described in the abovementioned document EP-B1-2 455 356.

Characterization of Each Pyrolyzed Composition C1, C2 and C0:

Each composition C1, C2 and C0 prepared by carrying out these first and second polycondensation and gelling, drying and pyrolysis steps was characterized by measuring the density of each porous carbon C1, C2 and C0 by the weight/volume ratio of the monolith. The results presented in table 2 below were obtained by nitrogen adsorption manometry at 77 K on an ASAP 2020 device from Micromeritics, namely the values thus measured of respectively total, microporous and mesoporous specific surfaces and of respectively total and microporous pore volumes.

TABLE 2

|  | C1 | C2 | C0 |
| --- | --- | --- | --- |
| Density (g · cm$^{-3}$) | 0.89 | 0.96 | 0.68 |
| Specific surface (m$^2$ · g$^{-1}$) | 600 | 589 | 800 |
|  | 558 microporous (i.e. 93%) | 498 microporous (i.e. 84.6%) | 460 microporous (i.e. 57.5%) |
|  | 82 mesoporous (i.e. 7%) | 91 mesoporous (i.e. 15.4%) | 340 mesoporous (i.e. 42.5%) |
| Pore volume (cm$^3$ · g$^{-1}$) | 0.30 | 0.35 | 1.16 |
|  | 0.22 microporous (i.e. 73.3%) | 0.20 microporous (i.e. 57.1%) | 0.20 microporous (i.e. 17.2%) |

The porous carbons C1 and C2 according to the invention resulting from gels G1 and G2 based on hexamethylenetetramine according to a relatively high fraction by weight (in these examples, of between 10 and 14%) thus exhibit high specific surfaces (of the order of 600 m$^2$·g$^{-1}$) with low pore volumes (less than 0.40 cm$^3$·g$^{-1}$), in comparison with the pore volume, more than three times greater, which characterizes the "control" carbon C0 resulting from formaldehyde.

Furthermore, the micropore contribution in these two carbons C1 and C2 of the invention is very high, both for the specific surface (micropore fraction greater than 80%, indeed even 90% for the preferred carbon C1) and for the pore volume (micropore fraction greater than 50%, even greater than 70% for this carbon C1), in comparison with micropore fractions for the specific surface and the pore volume of the carbon C0, which are respectively less than 60% and than 20%.

It should be noted that carbon C0 exhibits a higher specific surface than those of the carbons C1 and C2 but a much higher pore volume, which implies that the amount of electrolyte for filling this carbon C0 is greater than for carbons C1 and C2 of the invention.

Electrochemical Tests with Porous Carbons C1 and C2:

Electrodes E1 and E2 were respectively prepared from porous carbons C1 and C2. For this, binders, conductive fillers, various additives and each porous carbon were mixed with water according to the method described in example 1 of the document FR-A1-2 985 598 on behalf of the applicant company. The formulation obtained was coated and then crosslinked on a metal collector. The capacitance of the electrodes E1 and E2 was measured electrochemically by using the following device and tests.

Two identical electrodes isolated by a separator were mounted in series within a supercapacitor measurement cell containing an aqueous electrolyte (1M $H_2SO_4$ in a first series of tests and 5M $LiNO_3$ in a second series of tests) and controlled by a Bio-Logic VMP3 potentiostat/galvanostat via a three-electrode interface. The first carbon electrode corresponds to the working electrode, the second constitutes the counterelectrode, and the reference electrode used is the calomel reference electrode.

The capacitances of the electrodes were measured by subjecting the system to charging/discharging cycles at a constant current I of 0.125 A/g for the working electrode (positive electrode). As the potential changes linearly with the charge conveyed, the capacitance of each supercapacitive electrode was reduced from the slopes p in the charging and in the discharging (C=I/p). The mean specific capacitances thus measured for each electrode E1 and E2 can be seen:

in table 3, which gives the performances of these electrodes for a supercapacitor in an electrolyte based on 1M $H_2SO_4$, and in table 4, for the performances of the electrodes of a supercapacitor comprising an electrolyte based on 5M $LiNO_3$, before and after the activation post-treatment of the carbon C1 during the abovementioned third step.

TABLE 3

|  | 1M $H_2SO_4$ Electrolyte | |
| --- | --- | --- |
|  | E1 | E2 |
| Specific capacity positive electrode (F/g) | 170 | 175 |
| Specific capacity negative electrode (F/g) | 250 | 270 |

TABLE 4

|  | 5M $LiNO_3$ Electrolyte | |
| --- | --- | --- |
|  | C1 before post-treatment | C1 after post-treatment |
| Specific capacity positive electrode (F/g) | 115 | 125 |
| Specific capacity negative electrode (F/g) | 105 | 150 |

These tables 3 and 4 show that the porous carbons C1 and C2 of the invention confer elevated electrochemical performances on electrodes incorporating them within a supercapacitor having an acidic or basic aqueous electrolyte, preferably with the implementation of an acid impregnation post-treatment of these porous carbons according to the invention which makes it possible to further improve the performance of these electrodes incorporating them.

The invention claimed is:

1. A gelled aqueous polymer composition capable of forming, by drying and then pyrolysis, a monolithic porous carbon, the composition comprising the product of a polycondensation reaction in an aqueous solvent W of polyhydroxybenzene(s) R and hexamethylenetetramine H,
   wherein
   the polycondensation reaction is performed with polyhydroxybenzene(s) R and hexamethylenetetramine H as sole monomers, without a catalyst and without formaldehyde, such that an H/(R+H+W) fraction by weight is from 7% to 15% inclusive.

2. The gelled composition of claim 1, wherein the H/(R+H+W) fraction by weight is from 10% to 14% inclusive.

3. The gelled composition of claim 1, wherein a R/H molar ratio of the polyhydroxybenzene(s) R and the hexamethylenetetramine H in the polycondensation reaction is from 2 to 4 inclusive.

4. The gelled composition of claim 1, wherein a R/W ratio of the polyhydroxybenzene(s) R and the aqueous solvent W in the polycondensation reaction is from 0.07 to 1 inclusive.

5. The gelled composition of claim 1, wherein the composition is devoid of any amphiphilic polymer, any hydrophobic compound, or any mixture thereof.

6. The gelled composition of claim 1, wherein:
   the aqueous solvent W is water and the polyhydroxybenzene(s) R is resorcinol.

7. A process for preparing the gelled composition of claim 1, the process comprising:
   a) performing a polycondensation reaction in an aqueous solvent W of polyhydroxybenzene(s) R and hexamethylenetetramine H in order to obtain a polycondensate in an aqueous medium; and then
   b) a gelling by heating the polycondensate, in order to obtain the gelled composition;
   wherein
   the polycondensation reaction is performed with polyhydroxybenzene(s) R and hexamethylenetetramine H as sole monomers, without a catalyst and without formaldehyde, such that an H/(R+H+W) fraction by weight is from 7% to 15% inclusive.

8. The process of claim 7, comprising:
   a1) dissolving the polyhydroxybenzene(s) R in a first portion of the aqueous solvent W, in order to obtain a first aqueous solution;
   a2) dissolving by heating the hexamethylenetetramine H in a second portion of the aqueous solvent, in order to obtain a second aqueous solution; and
   a3) contacting the first aqueous solution with the second aqueous solution, until a third homogeneous aqueous solution comprising the polycondensate is obtained.

9. A gelled aqueous polymer composition capable of forming, by drying and then pyrolysis, a monolithic porous carbon, wherein the composition consists of the product of a polycondensation reaction in an aqueous solvent W of polyhydroxybenzene(s) R and hexamethylenetetramine H,
   wherein the polycondensation reaction is performed with polyhydroxybenzene(s) R and hexamethylenetetramine H as sole monomers, without a catalyst and without formaldehyde, such that an H/(R+H+W) fraction by weight is from 7% to 15% inclusive.

* * * * *